(12) United States Patent
Mahajan et al.

(10) Patent No.: US 9,330,634 B2
(45) Date of Patent: *May 3, 2016

(54) CHANGING VISUAL CONTENT COMMUNICATION

(71) Applicant: Microsoft Technology Licensing, LLC, Redmond, WA (US)

(72) Inventors: Rajneesh Mahajan, Bellevue, WA (US); Vladimir Stoyanov, Redmond, WA (US); Casey Dvorak, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,717

(22) Filed: Jun. 5, 2015

(65) Prior Publication Data

US 2015/0279337 A1 Oct. 1, 2015

Related U.S. Application Data

(63) Continuation of application No. 14/506,111, filed on Oct. 3, 2014, now Pat. No. 9,082,337, which is a continuation of application No. 11/957,321, filed on Dec. 14, 2007, now Pat. No. 8,890,874.

(51) Int. Cl.
   *G09G 5/377* (2006.01)
   *G09G 5/00* (2006.01)
   *G09G 5/14* (2006.01)
   *H04N 19/156* (2014.01)

(52) U.S. Cl.
   CPC ............... *G09G 5/377* (2013.01); *G09G 5/006* (2013.01); *G09G 5/14* (2013.01); *H04N 19/156* (2014.11); *G09G 2320/103* (2013.01); *G09G 2340/125* (2013.01)

(58) Field of Classification Search
   None
   See application file for complete search history.

(56) References Cited

U.S. PATENT DOCUMENTS

| 5,880,728 A | 3/1999 | Yamaashi et al. |
| 6,343,313 B1 | 1/2002 | Salesky et al. |
| 6,349,301 B1 * | 2/2002 | Mitchell ................. A63F 13/12 |
| 6,564,380 B1 | 5/2003 | Murphy |

(Continued)

FOREIGN PATENT DOCUMENTS

| CN | 1399442 A | 2/2003 |
| CN | 1507243 A | 6/2004 |

(Continued)

OTHER PUBLICATIONS

"World's First Video Stream Server Capable of Handling up to Ten Uncompressed HDTV Video Streams", available at least as early as Sep. 28, 2007, at: http://www.physorg.com/pdf4241.pdf, pp. 3.

(Continued)

*Primary Examiner* — Said Broome
(74) *Attorney, Agent, or Firm* — Kate Drakos; Danielle Johnston Holmes; Micky Minhas

(57) ABSTRACT

Techniques for presenting changing visual content, including video, animation and so on, as an overlay are discussed. Changing visual content, included in a visual presentation, may be identified from other visual elements included in the visual presentation. The changing visual content may be manipulated based on available resources associated with presenting the changing visual content as an overlay for a client.

20 Claims, 4 Drawing Sheets

(56) References Cited

U.S. PATENT DOCUMENTS

| | | | |
|---|---|---|---|
| 6,624,761 | B2 | 9/2003 | Fallon |
| 6,637,031 | B1 | 10/2003 | Chou |
| 6,959,449 | B1 | 10/2005 | Fujii |
| 7,046,269 | B2 | 5/2006 | Parker et al. |
| 7,219,127 | B2 | 5/2007 | Huck et al. |
| 7,266,616 | B1 | 9/2007 | Munshi et al. |
| 7,274,368 | B1 | 9/2007 | Keslin |
| 7,548,657 | B2 | 6/2009 | Deaven |
| 7,562,397 | B1 * | 7/2009 | Mithal ............ G06Q 30/0235 705/52 |
| 8,370,745 | B2 * | 2/2013 | Gould ............ G06F 3/04855 715/720 |
| 8,392,596 | B2 | 3/2013 | Kamay |
| 8,890,874 | B2 | 11/2014 | Mahajan et al. |
| 9,082,337 | B2 | 7/2015 | Mahajan et al. |
| 2001/0036581 | A1 | 11/2001 | Inao et al. |
| 2002/0015042 | A1 * | 2/2002 | Robotham ............ G06F 3/14 345/581 |
| 2002/0091762 | A1 | 7/2002 | Sohn et al. |
| 2003/0132959 | A1 | 7/2003 | Simister et al. |
| 2003/0236909 | A1 | 12/2003 | Chu |
| 2004/0151390 | A1 | 8/2004 | Iwamura |
| 2004/0201618 | A1 | 10/2004 | Alderson |
| 2007/0028286 | A1 | 2/2007 | Greene et al. |
| 2007/0035543 | A1 | 2/2007 | David et al. |
| 2007/0112971 | A1 | 5/2007 | Noff et al. |
| 2007/0236475 | A1 * | 10/2007 | Wherry ............ G06F 3/0485 345/173 |
| 2008/0270110 | A1 * | 10/2008 | Yurick ............ G06F 17/30026 704/3 |
| 2010/0138744 | A1 | 6/2010 | Kamay et al. |
| 2010/0254622 | A1 | 10/2010 | Kamay et al. |
| 2011/0145486 | A1 | 6/2011 | Owa et al. |
| 2013/0011064 | A1 | 1/2013 | Kamay et al. |
| 2013/0039408 | A1 | 2/2013 | Cohen et al. |

FOREIGN PATENT DOCUMENTS

| | | |
|---|---|---|
| CN | 1638456 A | 7/2005 |
| CN | 1992890 A | 7/2007 |
| EP | 0920219 A2 | 6/1999 |
| EP | 0920219 A3 | 6/1999 |
| JP | 1994-324662 A | 11/1994 |
| JP | 2004-056777 | 2/2004 |
| JP | 2004-166132 | 6/2004 |
| JP | 2004-166156 | 6/2004 |
| JP | 2006-173962 | 6/2006 |
| JP | 2007-506368 | 3/2007 |
| KR | 10-2001-0036581 A | 5/2001 |
| KR | 10-0322727 B1 | 6/2002 |
| KR | 10-2006-0031829 A | 4/2006 |
| KR | 20070070534 A | 7/2007 |
| RU | 2259588 C2 | 8/2005 |
| RU | 2005120233 A | 1/2006 |
| WO | WO 2009/079190 A2 | 6/2009 |
| WO | WO 2009/079190 A3 | 6/2009 |

OTHER PUBLICATIONS

Chinese 1st Office Action in Application 201310060728.9, mailed Sep. 22, 2014, 8 pgs.
Chinese 2nd Office Action in Application 201310060728.9, mailed Apr. 3, 2015, 10 pgs.
Chinese Notice of Allowance in Application 201310060728.9, mailed Aug. 27, 2015, 4 pgs.
Chinese Notice of Allowance in Application No. 200880121262.6, mailed Dec. 16, 2012, 4 pages.
Chinese Patent Office Notice on First Office Action cited in Application No. 200880121262.6, dated Jun. 29, 2011, (in Chinese with English translation attached): 14 pages.
Chinese Patent Office Notice on Second Office Action cited in Application No. 200880121262.6 mailed Jul. 2, 2012, 7 pgs.
European Patent Office Communication Pursuant to Rules 70(2) and 70a(2) EPC dated Apr. 26, 2011, cited in Application No. 08861110.8-1228/2232858 (PCT/US2008/084975); 1 page.
International Search Report and Written Opinion of the International Searching Authority, dated Jun. 12, 2009, issued in PCT/US2008/084975, 11 pp.
Japanese Decision of Refusal in Application 2010-538040, mailed Jun. 3, 2014, 7 pgs.
Japanese Final Notice of Rejection in Application 2010-538040, mailed Dec. 17, 2013, 7 pgs.
Japanese Notice of Rejection in Application 2010-538040, mailed Feb. 1, 2013, 8 pgs.
Korean Final Notice of Preliminary Rejection in Application 10-2010-7014979, mailed Apr. 27, 2015, 4 pgs.
Korean Notice of Preliminary rejection in Application 1020107014979, mailed Oct. 20, 2014, 12 pgs.
Lemair, et al., "Bamba—Audio and video streaming over the Internet", at: http://www.research.ibm.com/journal/rd/422/willebeek.html, Multimedia Systems, vol. 42, No. 2, 1998, pp. 11.
Russian Notice of Allowance in Application 2010129037, mailed Aug. 19, 2013, 16 pgs.
Supplementary European Seach Report dated Apr. 7, 2011, issued in Application Serial No. 08861110.8, 7 pp.
U.S. Appl. No. 11/957,321, Amendment and Response filed Jan. 3, 2013, 15 pgs.
U.S. Appl. No. 11/957,321, Amendment and Response filed Oct. 25, 2011, 17 pgs.
U.S. Appl. No. 11/957,321, Amendment and Response filed Nov. 12, 2013, 13 pgs.
U.S. Appl. No. 11/957,321, Amendment and Response filed Apr. 27, 2012, 15 pgs.
U.S. Appl. No. 11/957,321, Amendment and Response filed May 5, 2014, 11 pgs.
U.S. Appl. No. 11/957,321, Amendment and Response filed Jul. 25, 2013, 10 pgs.
U.S. Appl. No. 11/957,321, Notice of Allowance mailed Oct. 23, 2014, 5 pgs.
U.S. Appl. No. 11/957,321, Notice of Allowance mailed Jul. 30, 2014, 8 pgs.
U.S. Appl. No. 11/957,321, Office Action mailed Oct. 3, 2012, 12 pgs.
U.S. Appl. No. 11/957,321, Office Action mailed Dec. 27, 2011, 9 pgs.
U.S. Appl. No. 11/957,321, Office Action mailed Feb. 4, 2014, 11 pgs.
U.S. Appl. No. 11/957,321, Office Action mailed Mar. 25, 2013, 11 pgs.
U.S. Appl. No. 11/957,321, Office Action mailed Aug. 13, 2013, 11 pgs.
U.S. Appl. No. 11/957,321, Office Action mailed Sep. 14, 2011, 9 pgs.
U.S. Appl. No. 14/506,111, Amendment after allowance filed Apr. 21, 2015, 3 pgs.
U.S. Appl. No. 14/506,111, Amendment and Response filed Mar. 18, 2015, 10 pgs.
U.S. Appl. No. 14/506,111, Notice of Allowance mailed Apr. 8, 2015, 11 pgs.
U.S. Appl. No. 14/506,111, Office Action mailed Dec. 18, 2014, 5 pgs.

* cited by examiner

CHANGING VISUAL CONTENT COMMUNICATION

CROSS-REFERENCE TO RELATED APPLICATIONS

This application is a continuation application of U.S. patent application Ser. No. 14/506,111, entitled "CHANGING VISUAL CONTENT COMMUNICATION," filed on Oct. 3, 2014 (now U.S. Pat. No. 9,082,337), which application is a continuation application of U.S. patent application Ser. No. 11/957,321, filed on Dec. 14, 2007 (now U.S. Pat. No. 8,890,874), the entire disclosures of which are hereby incorporated herein by reference.

BACKGROUND

Communicating video content in a terminal server session may be inefficient as the relatively large amount of data, forming the video content, may be frequently updated along with other visual content. For instance, video data may be refreshed and communicated with the other screen content such as text. The additional content may be communicated with the video content even though the additional content may not change at the same rate as the video content.

SUMMARY

Techniques for presenting changing visual content, including video, animation and so on, as an overlay are discussed. Changing visual content, included in a visual presentation, may be identified from other visual elements included in the visual presentation. The changing visual content may be manipulated based on available resources associated with presenting the changing visual content as an overlay for a client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Accordingly, techniques are described which may permit remote presentation of changing visual content which may include video content, animation, and so on which changes frequently based on a threshold or in comparison to other visual content. For example, identified changing visual content may be presented as an overlay on a remote device. Changing visual content may be treated differently from other visual content which may not change, change at a lesser rate than that of the changing video content or not meet a change threshold. Presenting changing visual content as an overlay may allow the data forming the content to be handled as changing content (e.g., video) based on available resources. Changing visual content may be manipulated and communicated so that the available resources may be used efficiently.

In implementations, a system including an identification module may identify changing visual content. For instance, animation, which includes screen updates in excess of a set threshold, may be identified based on the aspect ratio for a bitmap representing the animated content. In this manner, the changing animation may be identified from other visual content and manipulated on that basis. The identified visual content may be manipulated depending on available resources. Manipulation may include compressing the data forming the content, dropping updates, e.g., video frames, and so on which may be implemented depending on the resources available for handling the changing visual content.

Exemplary Environment

Figure 1:
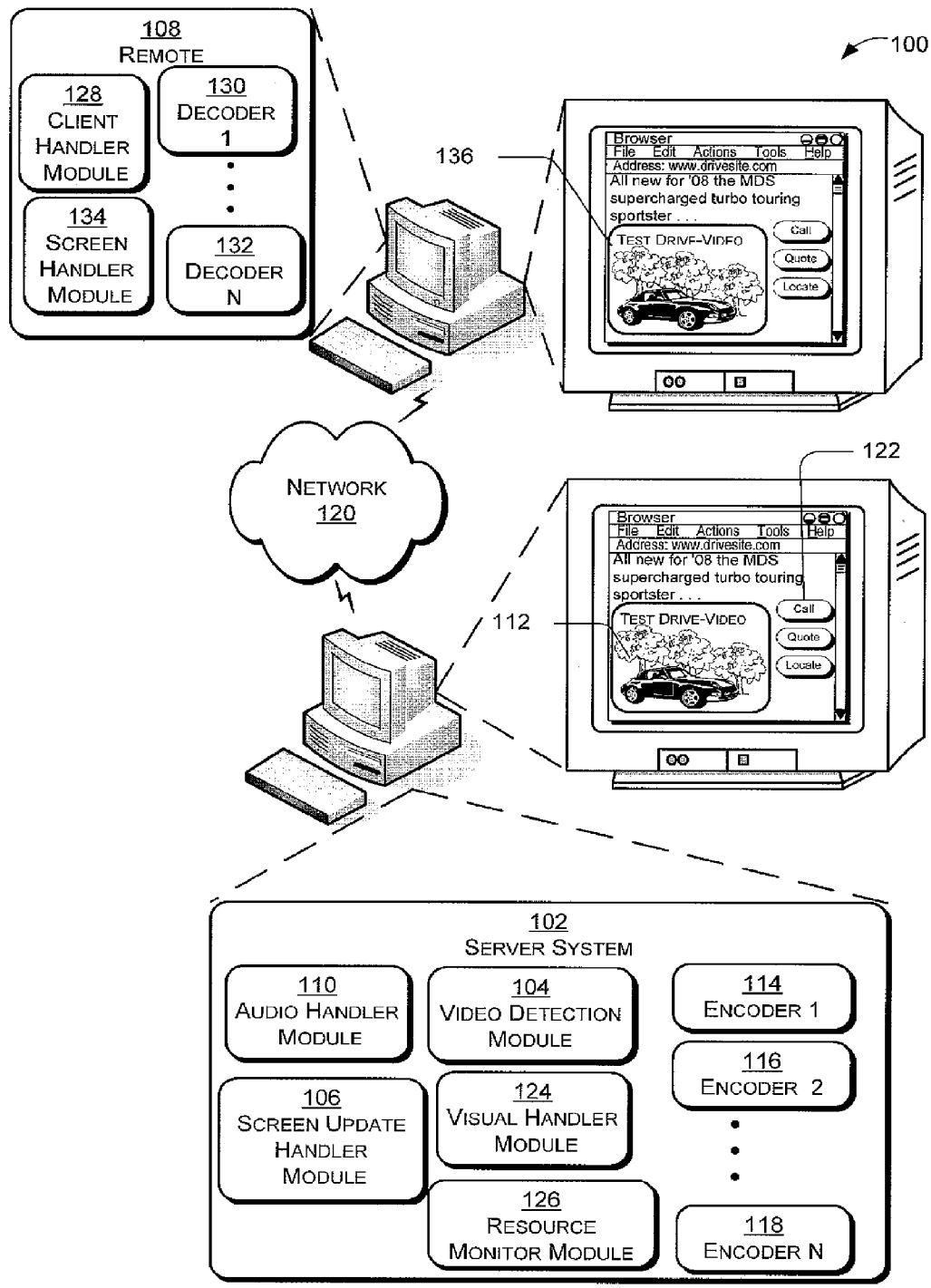
FIG. 1 illustrates an environment in exemplary implementations that may use changing visual content.
Figure 2:
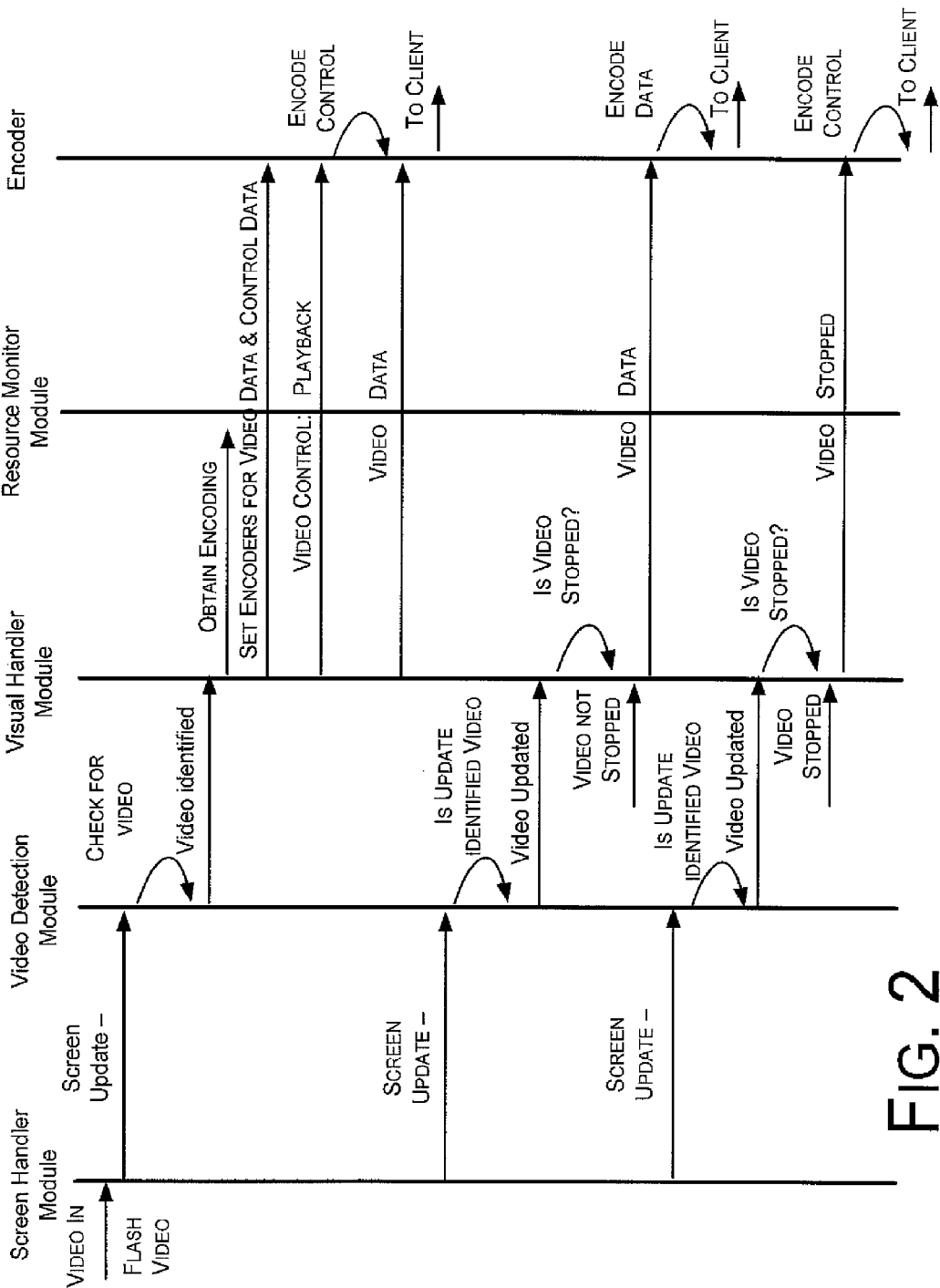
FIG. 2. is a flow diagram depicting exemplary data flows when communicating changing visual content.

FIG. 1 illustrates an environment 100 in exemplary implementations which may remotely present changing visual content. FIG. 2 illustrates exemplary techniques and data flows which may be performed by the exemplary implementations discussed herein. A system 102 may include a video detection module 104 for determining if changing visual content is included in the visual content.

For example, if a screen updated handler 106 provides video content and other visual content (which may not change) the video detection module 104 may identify the existence of the changing video content within the provided visual content. While video content is primarily discussed, exemplary changing visual content may include, but is not limited to, animation, transitions (such as a POWERPOINT (Microsoft Corporation, Redmond, Wash.) transition) and so on which may change in comparison to other visual data or change beyond a set threshold (e.g., no change) and so on.

The screen update handler module 106 may forward the other visual content such as text, graphical objects and so on to a remote client 108 for display, while the changing visual content is handled as discussed herein. For example, the other visual content may be updated less frequently in comparison to video, animation or other changing visual content if the former visual components change nominally or do not change. Treating the other visual content differently may minimize the impact of various compression schemes in comparison to when a common compression scheme is applied to both the changing visual content and the other visual content.

An audio handler module 110 may be included to obtain audio content which is associated with the changing visual content. The audio content may be handled separately from the changing visual content so the content may be handled in a content specific manner. For an uncompressed video clip, the audio data may be segregated from the video data for subsequent recombination using timestamps to synchronize the audio data with the corresponding video data when presented on a remote client device 108.

Using the video detection module 104 to identify changing visual content may permit the underlying data to be handled differently than other visual content. While changing visual content (such as a video 112) may be processed and communicated in a first manner, non-changing or minimally changing visual content may be treated in a different or second manner so that the other content may not overly consume resources and may permit changing visual content to be handled in a manner which is changing visual content specific.

The video detection module 104 may identify the changing visual information in an uncompressed state. The other visual content may be updated at a lesser rate than that of the changing visual content and thereby minimize the overall data being transmitted.

The video content, or other changing visual content, may be encoded and/or communicated based on computing resources including communication resources available for performing the task. As a result, the system's encoding capabilities (such as encoders 114-118) and the communication resources (e.g., network 120) may be used efficiently without bogging down computing resources, while handling the changing visual content in a changing visual content specific manner. If, for instance, a display includes a flash video, as well as, text and graphical objects, the text and graphical objects may not change or may seldom change in comparison to the video content or a threshold update rate used to distinguish changing from non-changing content. Examples of non-changing or minimally changing content may include, but are not limited to text, graphical objects and so on which may not change or do so infrequently in comparison to changing visual content.

In an example, a video of a car driving 112 may be presented in a window, while text and graphical objects 122, which permit a user to contact a dealer, receive a quote, may be presented on other portions of the display. In comparison, the video portion of the display may change frequently in comparison to the other visual content or some criteria. The text and graphical objects may remain unchanged or change infrequently based on a similar comparison or predetermined screen update standard.

The video detection module 104 may identify the visual content is changing based on a variety of criteria. Exemplary criteria may include, but are not limited to, screen update frequency, aspect ratio, window class name, process name for a screen update and so on. Moreover, the video content detection module 104 may determine if the changing content has stopped playing or has been halted. If the changing content has stopped, the video detection module 104 may identify that the window for presenting the changing visual content should be terminated when replicated on a client device. If play of the changing content is merely halted, the overlay presenting the changing content on the client device may remain although no content may be presented or the overlay may be blacked out.

A screen update frequency may be identified according to the number of screen updates per second, e.g., twenty-four frames per second for film, twenty-five frames per second for European television, thirty frames per second for American television and so on. In implementations, a screen update rate may be used as a threshold for determining if visual content is changing. The foregoing examples being exemplary only. In implementations, combination of criteria may be used for identification. In further examples, changing visual content may be heuristically identified.

A changing visual content aspect ratio may be identified according to the aspect ratio of a bitmap representing the visual content. For instance, a 4:3 ratio may indicate standard television content while a 16:9 ratio may indicate wide screen changing content. A window class name may include the name of the renderer used for presenting a window which would, at least, partially cover a screen on which the visual content is to be presented. Changing visual content may be identified if a window has a 4:3 ratio and is updating at approximately twenty-four frames per second.

A handler module 124 may direct manipulation of the identified changing visual content. For instance, once identified, animated content may be manipulated, as directed by the handler module, based on the computing resources available for processing including communicating the data. Manipulation may include dropping frames (for video) or screen updates (for animation); compressing the contents; not sending the changing visual contents; use of a particular encoding scheme and so on. For example, bitmaps representing animation or video may be dropped.

For example, if, a relatively large amount of bandwidth is available, the hander module 124 may direct one or more encoders 114-118 modules to implement a simple encoding scheme (e.g., a lossy encoding technique) to minimize processor overhead for the changing visual content. In contrast, if, bandwidth available is limited, a resource intensive encoding technique may be used to minimize bandwidth consumption. Combinations of factors may be considered as well including resources dedicated to other non-related tasks and so on. For example, the encoder modules "1-N" 114-118 may implement various formats including, but not limited to, video codec 1 (VC1), moving picture experts group (MPEG), joint photographic experts group (JPEG) and so on.

Control information may be included with the data forming the visual content. Control information may include data for directing how the changing visual content is to be remotely presented. For instance, control information may include the size of an overlay which is to present the changing data, the position of the overlay on the display, timestamps and so on (e.g., an overlay including the car video 136 on remote client 108). The one or more encoder modules may encode the control information with the changing visual content data for communication to a remote client. For example, when remotely presented, the visual content, including the changing visual content may mirror the server's configuration of the visual data. This is to say, that the overlay as well as the other visual content may be presented on the client as the visual content was obtained by the server screen update handler 106. In further implementations, control data may be sent separately, sent in segregated portions of the data stream forwarding the content data and control data and so on with the timestamps permitting synchronization of audio and visual content.

A resource monitor module 126 may monitor the availability of computing resources, including communication resources, associated with remotely presenting the visual content. For example, the resource monitor module 126, included in the server system, may send the handler module 124 an indication of the computing resources associated with presenting the visual content on a remote client. If, for instance, bandwidth is limited, the handler module 124 may select to drop frames, use a particular encoding technique and so on, based on the resources as determined by the resource monitor. Relevant resource indications may include, but are not limited to, indications regarding: the availability of communication bandwidth (e.g., network 120), available processor resources (e.g., server resources and/or client resources), available encoders and so on. In this way, the handler module 124 may access the available resources for remotely presenting the changing visual content without overwhelming the computing resources or overly consuming computing resources. Using a resource monitor module 126 may tailor how the changing visual content is to be communicated, what changing visual content is communicated and so on in accordance with available computing resources. Resource usage may change as the changing visual content is provided to the remote client based on resource availability.

The remote client 108 may include a client handler module 128 which determines how to present the decoded changing visual content. For example, the client handler module 128 may present the changing content (which is decoded by client decoders "1-N" 130-132 as an overlay based on the control data which was encoded with the content data. In the foregoing manner, the client hander module 128 may reconstruct the changing visual content so the presentation of the changing visual content matches that of the server 102, such as if the content were to be presented on a display associated with the server 102. For example, the size, aspect ratio and so on may be specified by control data included with the changing video content. Control data may include information related to child video window detection, geometry tracking which correspondingly may be used by the client handler module when determining how to present the changing visual content. If applicable, audio may be recombined with the changing visual content using timestamps for coordinating the multimedia.

A client screen handler 134 may receive the other visual data, if applicable, from the server screen update handler. For example, while video is presented as an overlay on a client display, the text, graphical objects and so on may be presented as "background" to the overlay. This is to say, that while the video may be segregated and treated individually, the generally non-changing visual content portion may be presented on a client display with the video content portion over at least a portion of the display. The overlay and the other visual content, if present, may be arranged and configured so as to be displayed on the client matches the content from the server screen update handler module 106.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., tangible memory and so on.

The following discussion describes transformation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Exemplary Procedures

The following discussion describes a methodology that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. A variety of other examples are also contemplated.

Figure 3:
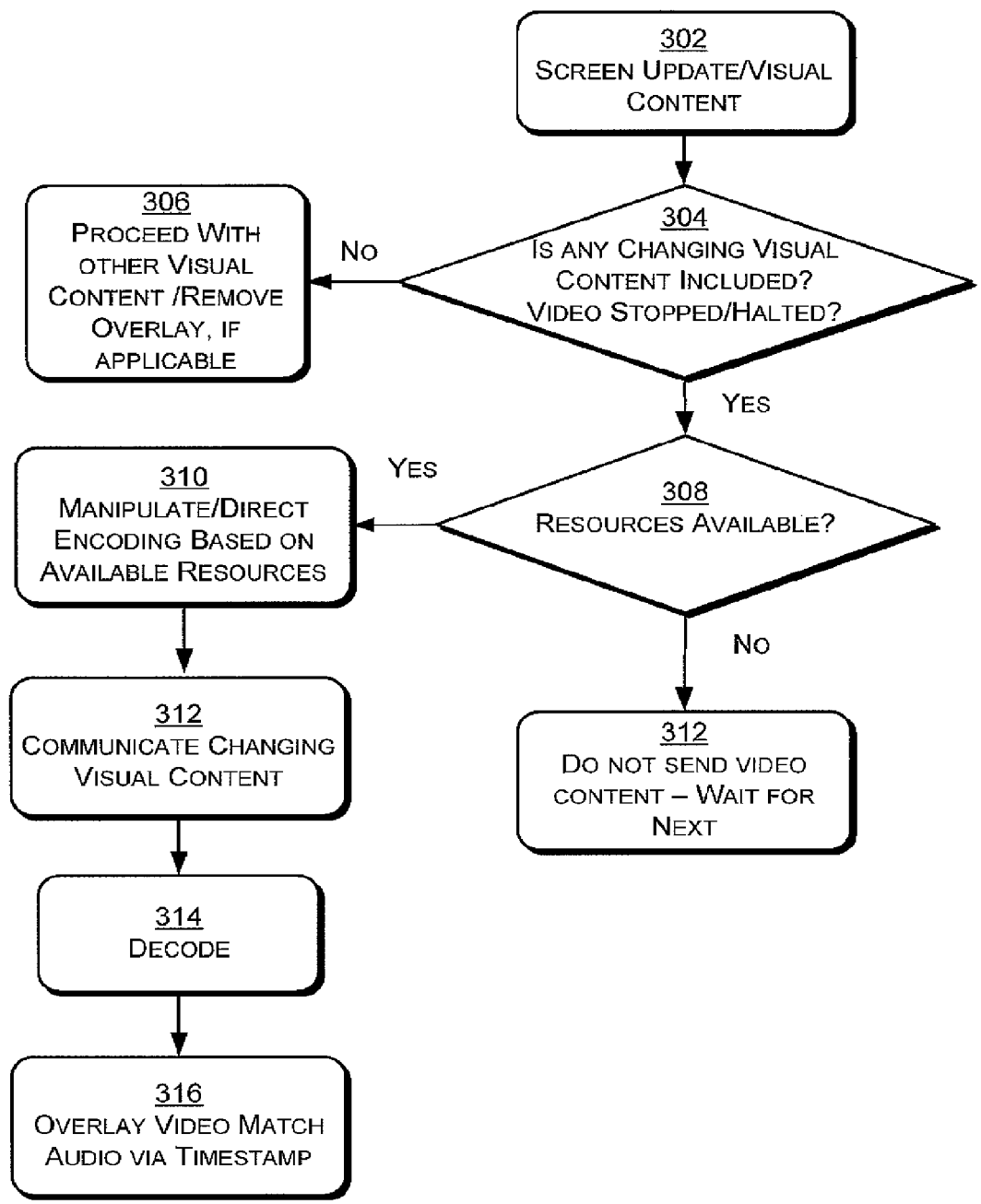
FIG. 3 is a flow diagram depicting a procedure in exemplary implementations in which changing visual content is communicated.

FIG. 3 discloses exemplary procedures for providing changing visual data as an overlay. Displaying changing visual content which may change frequently, in comparison to a set standard or other visual content, may permit handling of the data forming the changing visual data at a low-level, while tailoring data handling in accordance with available computing resources. For example, the visual presentation may be remotely presented on a client device accessing video content from a web server.

Changing visual content, which may be included with other visual content (which does not change or changes a negligible rate) as part of a screen update 302, may be identified in an uncompressed state 304. For instance, changing visual content may include, but is not limited to, video, transitions, animation and so on which updates at generally regular intervals. Changing visual content may be in contrast to, as applicable, non-changing visual content, minimally changing content, or compared to some set standard (e.g., a rate of change or screen update). Identification 304 of changing visual content may be at least partially based on an update frequency, the aspect ratio of the content, window identification, process name and so on. Heuristic techniques may be used in conjunction with identifying changing visual content.

In examples, combinations of the above criteria may be considered. Changing visual content identification 304 may be based on if the aspect ratio of a window matches that of a movie or film display and if the process name for an incoming screen update matches that of a video player. For example, if the content is in a 4:3 aspect ratio, and the process name for the update matches that associated with player for playing a television broadcast, the visual content may be identified as changing content, even if, for instance, playback play of the changing content is momentarily paused. Exemplary process names may include, but are not limited to, WINDOWS MEDIA CENTER (Microsoft Corporation, Redmond, Wash.) and so on. If changing visual content is not present or visual content has stopped flowing an update of other content may occur or the overlay from stopped changing content may be removed 306.

The available resources may be evaluated 308. The particular manipulation and/or compression scheme selected 310 may be in accordance with the parameters of the computing resources handling the remote presentation. For example, computing resources may be evaluated 308 to determine availability. Exemplary computing resources parameters which may be considered when manipulating and/or direct encoding of the changing visual content 310 include, but are not limited to, server resource, client resources, and communication resources. For instance, if relatively little bandwidth is available in comparison to the data which may be communicated, the changing visual content may not be sent such as by halting a video 312 or dropping frames as part of manipulating 310 the changing visual content.

Accordingly, the changing video or animation content may be handled based on the available computing resources 308, while other visual content is handled via other techniques. For example, minimally changing text and graphical objects may be separately transferred for client presentation. If applicable, the other visual content may be handled in a different manner. For example, minimally changing visual content may be updated at a different rate or communicated separately. In this way, the changing visual content may overlaid over the minimally changing content so that a client visual presentation matches that of the remote source providing the visual content. In implementations, changing visual content and other visual content may be recreated (e.g., with the changing content in an overlay) so that the visual presentation matches that of the visual content at identification. In other instances, minimally changing content may be overlaid over the changing content. An example of the foregoing may include, an irregular region, such as a notification popup (such as a OUT- LOOK (Microsoft Corporation, Redmond, Wash.) notification window) overlaid over the changing content. In this manner, the changing content may be partially obscured by non-changing content.

The identified changing visual content may be manipulated 310 as desired. For example, manipulation may include compressing the changing visual content, dropping frames or screen updates for the changing visual content, halting play of the changing visual content 312 and the like. For example, the changing visual content may be manipulated 310 so that the overlaid video or animation appears on the client in a particular location on a display, matches a designated size, aspect ratio or so on. In implementations, child window detection, geometry tracking or similar techniques may be used when creating an overlay to present changing visual content. The foregoing techniques may permit low level remoting of the changing visual content.

Exemplary, resource considerations include, but are not limited to, selecting a particular encoding technique or dropping frames to minimize bandwidth consumption, manipulating the changing visual content based on other tasks being handled by the server. For example, a lossy compression scheme may be used if bandwidth is at a premium. Thus, while encoding the content 310 may be more intensive, the reduced bandwidth consumption may be of chief consideration.

The changing visual content may be encoded 310 for communication to a client. For instance, control data and the data forming the changing visual content may be encoded via a variety of techniques for communication 312 to a remote client. In other instances, control data and content data may be individually communicated. Encoding/directing encoding may include using VC1, MPEG and the like techniques for encoding and/or compressing the content for remote presentation.

Audio content may be separately handled and communicated. For instance, timestamps may be associated with the audio and video content and for use in re-synchronizing or matching presentation of audio content with the video, animation, or other changing visual content.

From a client perspective, the changing visual content may be presented as an overlay which overlies visual content which does not change or changes in a minimal fashion. For example, the client may decode 314 the changing visual content for presentation as an overlay. The overlay may be recreated based on control information forwarded by the server system providing the visual content. For instance, child window tracking, geometry tracking techniques may be used to generate and/or recreate the changing visual content so that the visual content appears as configured and arranged at identification 304.

If audio content is associated with the animation or video content, e.g., a multi-media presentation, the audio may be recombined 316 with the changing visual content. For example, corresponding timestamps tied, respectively, to the audio and visual data may be used to resynchronize the audio and video for presentation by the client. The audio content may be compressed for transmission. For instance, the compressed audio content, transferred in a separate datastream, may be uncompressed and the timestamps used in recombining with the video content. In further instances, the compressed audio and compressed changing video content may be transmitted in a common data stream.

Figure 4:
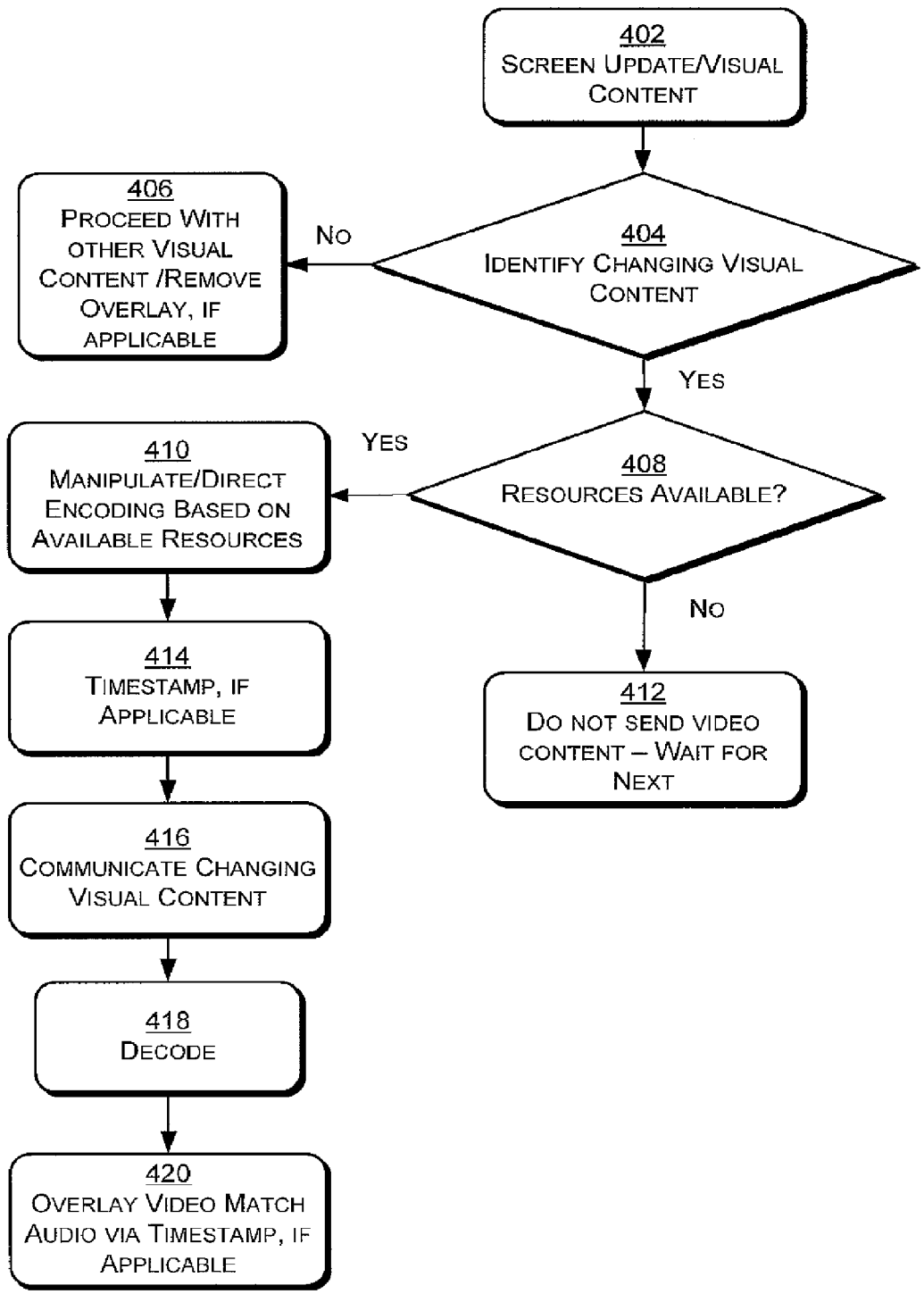
FIG. 4 is a flow diagram depicting a procedure in exemplary implementations in which visual content is communicated as an overlay.

FIG. 4 discloses exemplary procedures and instructions for providing changing visual data as an overlay. For instance, the techniques discussed below may be implemented as a set of computer executable instructions for remote presentation of changing video, animation or other changing visual content.

Uncompressed changing visual content included in a screen update 402 may be identified 404 from other visual components based on criteria including, screen update frequency, aspect ratio, window name, if a portion of the screen is covered by a window, the process name for the screen update may be considered as well. Combinations of the above identification parameters or criteria may be considered. For example, a video may be identified based on frame update frequency of a bitmap representing the video, while other visual content may remain substantially unchanged. Heuristic learning techniques may be used to improve identification of the changing visual content. If changing visual content is not identified, other visual content which may not change or only minimally change may be independently communicated to a client device 406. For example, if a video has stopped playing, the other graphical elements may be updated and an overly which formerly presented the video may be removed 406.

Upon identification 404, the various computing resources involved with communicating and presenting the visual content remotely may be checked 408 to determine if the computing resources are available to handle the changing visual content. Resource considerations may include, but are not limited to, encoder availability, network bandwidth, client parameters, available server processor capacity and so on. If sufficient computing resources are not available, the changing visual content may not be communicated 412. For instance, a screen update, which includes a change in video content, may not be sent if a network communicating the content does not have sufficient throughput.

If computing resources are available, the uncompressed data forming the changing visual content may be manipulated 410 based on the computing resources involved in handling and/or communicating the changing visual content 408. For example, manipulation 410 may include directing encoders to use a particular encoding technique, dropping frames or screen updates, not communicating the changing visual content 412, compressing the changing visual content data, including control information and so on in accordance with resource availability.

Control information may include data related to child window detection and/or geometry tracking which may be used to direct a client in the recreation of changing visual contents. In implementations, control information may be encoded with the data forming the changing visual content, while in other instances, control data may be co-extensively communicated with the data forming the changing visual content. Control data may specify how the changing visual content should be recreated by the client. For example, control data may indicate one or more of the size of an overlay for presenting a video, the aspect ratio of the overlay, the location of the overlay and so on.

Other visual elements which minimally change or do not change may be handled separately. For example, while video content may be handled in a first manner, non-changing graphical elements may be handled and/or communicated in a second fashion. For instance, minimally changing items may be communicated via different methodologies, at different update intervals and so on.

If audio content is associated with the changing visual content, timestamps 414 may be implemented to coordinate the changing visual content with audio content which may be handled separately. For example, a timestamp may be included with a video so that the audio may be matched up to the video overlay on a client device. In this manner, the audio may be communicated in an audio specific manner, while the changing visual content may be handled and/or communicated as discussed herein.

The encoded changing visual content may be communicated 416 in accordance with the determined computing resources. For example, if a relatively large amount of network bandwidth is available (in comparison to the changing visual content) a simpler algorithm, which may use less computing resources to encode/decode, may be used. If, in contrast, bandwidth is at a premium a more complex algorithm, which consumes less bandwidth but may burden encoders and/or decoders.

From the client side, the client may decode 418 the changing visual content for presentation as an overlay. The changing visual content may be presented as an overlay which overlies the visual content which does not change or changes in a minimal fashion. The overlay may be recreated based on control information forwarded by the server system providing the visual content. For instance, child window tracking, geometry tracking techniques may be used to generate and/or recreate the changing visual content so that the visual content appears as configured and arranged in the screen update 402. Other visual content such as non-changing or minimally changing content may be overlaid over the changing visual content. For example, a pop-up window may obscure a portion of the changing visual content overlay.

If audio content is associated with the animation or video content, e.g., a multi-media presentation, the audio may be matched 420 with the changing visual content. For example, corresponding timestamps tied, respectively, to the audio and visual data may be used to resynchronize the audio and video in the overlay for presentation by the client.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer system comprising:
a processor; and
a memory communicatively coupled to the processor comprising computer-readable instructions that when executed by the processor cause the computing system to:
detect changing visual content based on a comparison to non-changing visual content;
evaluate available resources;
transmit the non-changing visual content in a first format to the remote client;
manipulate the changing visual content based at least in part on the evaluation of the available resources; and
transmit the manipulated changing visual content in a second format to the remote client, wherein the second format is different from the first format.

2. The computer system of claim 1, wherein the changing visual content is identified based on evaluating at least one of: update frequency, aspect ratio, window identification, and process name.

3. The computer system of claim 1, wherein the changing visual content is identified based on evaluating a combination of two or more of:
update frequency, aspect ratio, window identification, and process name.

4. The computer system of claim 1, further comprising:
provide one or more timestamps in the changing visual content for matching the changing visual content to corresponding audio content based at least in part on the one or more timestamps.

5. The computer system of claim 4, further comprising:
overlay the changing visual content over the corresponding audio content.

6. The computer system of claim 1, wherein evaluating available resources comprises:
evaluate resources available on a server;
evaluate resources available on a network communicatively coupling the server and the remote client; and
evaluate resources available on the remote client.

7. The computer system of claim 1, wherein transmitting the manipulated changing visual content further comprises:
transmit control information for recreating the changing visual content as an overlay over the non-changing visual content at the remote client, wherein the control information comprises at least one of: child video window detection data and geometry tracking data.

8. The computer system of claim 1, wherein the changing visual content is uncompressed prior to manipulation.

9. The computer system of claim 1, wherein the non-changing visual content further comprises:
visual content that does not change; and
visual content that changes an amount less than a threshold.

10. A computing system comprising:
at least one processor; and
at least one memory communicatively coupled to the at least one processor comprising computer-readable instructions that when executed by the at least one processor cause the computing system to implement a method of transmitting visual content to a remote client, the method comprising:
distinguishing changing visual content from non-changing visual content, wherein the changing visual content is detected based on a comparison to the non-changing visual content;
evaluating available resources;
manipulating the changing visual content based at least in part on the evaluation of the available resources;
transmitting the non-changing visual content in a first format to the remote client; and
transmitting the manipulated changing visual content in a second format to the remote client.

11. The computer system of claim 10, wherein the changing visual content is distinguished from non-changing visual content based on heuristic learning techniques.

12. The computer system of claim 10, wherein manipulating the changing visual content comprises at least one of: compressing the changing visual content, not transmitting screen updates of the changing visual content, and not transmitting video frames of the changing visual content.

13. The computer system of claim 10, wherein evaluating available resources comprises:
evaluating resources available on a server;
evaluating resources available on a network communicatively coupling the server and the remote client; and
evaluating resources available on the remote client.

14. The computer system of claim 10, wherein a bitmap of the changing visual content changes at a predetermined update rate.

15. The computer system of claim 10, wherein manipulating the changing visual content is based on one or more of:

available bandwidth, available server processing capability, available client processing capability, available decoders, and available encoders.

16. The computer system of claim 10, further comprising:
   providing one or more timestamps in the changing visual content for matching the changing visual content to corresponding audio content based at least in part on the one or more timestamps; and
   overlaying the changing visual content over the corresponding audio content.

17. The computer system of claim 10, wherein the non-changing visual content further comprises:
   visual content that does not change; and
   visual content that changes an amount less than a threshold.

18. The computer system of claim 10, wherein the changing visual content is uncompressed prior to manipulation.

19. A method implemented on a computing system for transmitting visual content to a remote client, comprising:
   distinguishing changing visual content from non-changing visual content, wherein the changing visual content is detected based on a comparison to the non-changing visual content;
   evaluating available resources;
   manipulating the changing visual content based at least in part on the evaluation of the available resources;
   transmitting the non-changing visual content in a first format to the remote client; and
   transmitting the manipulated changing visual content in a second format to the remote client.

20. The method of claim 19, wherein the changing visual content is distinguished from non-changing visual content based on one of:
   update frequency, aspect ratio, window identification, and process name.

\* \* \* \* \*